June 20, 1933.  D. E. DOBYNS  1,915,053

CENTRIFUGAL SPIRAL AGITATOR

Filed March 9, 1931

INVENTOR
David E. Dobyns
BY
ATTORNEY

Patented June 20, 1933

1,915,053

UNITED STATES PATENT OFFICE

DAVID E. DOBYNS, OF TULSA, OKLAHOMA, ASSIGNOR, BY MESNE ASSIGNMENTS, OF ONE-FOURTH TO H. F. BROWNELL

CENTRIFUGAL SPIRAL AGITATOR

Application filed March 9, 1931. Serial No. 521,121.

My invention relates to mixers used for mixing food drinks such as malted milk and the like, and more particularly to an agitator for a mixer of this character, the principal objects of the invention being to expedite the mixing process of the food drink, and to produce a more thoroughly mixed drink of uniform quality.

Further objects of the invention are to provide a device for this purpose that may be readily attached to standard mixing devices without necessitating changes in such structures; that is simple to manufacture; and that may be readily operated on the surplus of power available from the regular motors supplied for such devices.

In accomplishing these and other objects of my invention I have provided improved details of structure, the preferred form of which is illustrated in the accompanying drawing, wherein.

Figure 1:
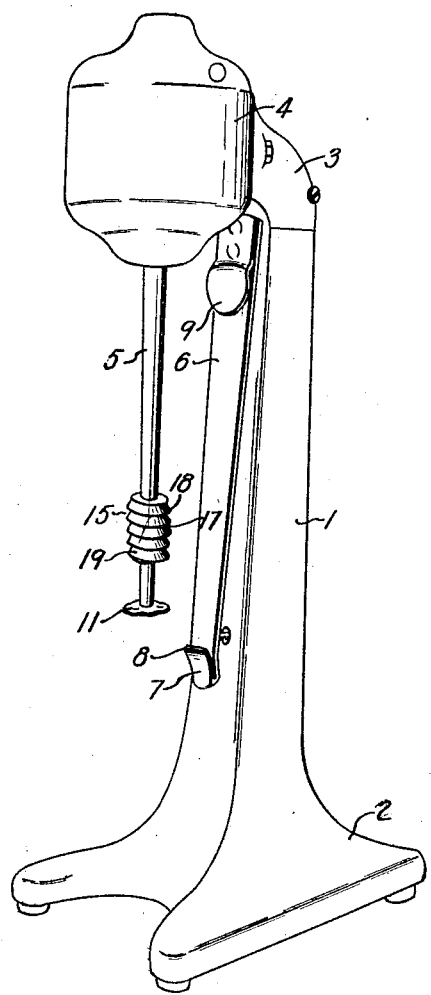
Fig. 1 is a perspective view of a mixing unit of common design provided with a spiral agitator embodying my invention.
Figure 2:
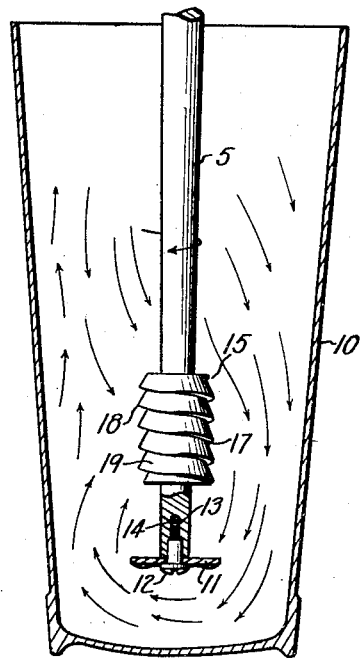
Fig. 2 is a sectional view of a receptacle and an elevational view of a mixer stem provided with the agitator and mounted in operable position in the receptacle.
Figure 4:
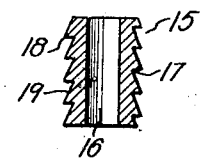
Fig. 4 is a central section of the agitator.
Figure 3:
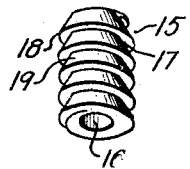
Fig. 3 is a detail perspective view of the spiral agitator viewed from its lower end.

Referring more in detail to the drawing:

1 designates a stand provided on its lower end with a base 2 and terminating at its upper end in a lateral bracket 3 for supporting a vertically mounted motor 4 adapted to drive a downwardly extending tapered shaft or mixing stem 5 for mingling food drinks, as in common practice.

A switch arm 6, provided on its lower end with a retractively bent portion 7 terminating in a laterally extending lip 8, and on its upper end with a yielding finger 9, is adapted to support a receptacle 10 for containing the food ingredients to be mixed, the weight of the receptacle and its contents urging the spring arm adjacent the stand to close the circuit to the motor. The lower end of the stem 5 commonly carries a mixing blade 11 secured thereto by a screw 12 having a threaded portion 13 engaging an internally threaded socket 14 of the stem.

The above described structure is well known soda fountain equipment and my invention resides only in a supplementary attachment 15 for producing a more thoroughly agitated mixture in a shorter period of time.

This attachment is preferably provided in the form of a cylindrical body having an axial bore 16 for slidably engaging the lower end of the mixing stem, and its outer surface is formed with a spiral groove 17 tapering upwardly and inwardly to produce cutting edges 18 and downwardly facing shoulders 19.

In constructing the agitator, a single piece of light metal such as aluminum is preferably used, although it is obvious that this device may be made of separate cooperating parts clamped together on the mixing stem or formed integrally with the stem.

Assuming a spiral agitator to be constructed as described, the process of assembling the attachment on the stem of a mixer, and the operation thereof, would be as follows:

After removing the screw 12 from the lower end of the stem and detaching the blade 11 therefrom, the cylindrical agitator is moved upwardly on the tapered stem until it is seated firmly thereon, the bore of the agitator being only sufficiently large to permit movement of the agitator on the tapered stem to a comparatively short distance from the lower end of the stem. The mixing blade is then again attached to the lower end of the stem 5 and the device is ready for operation.

When the circuit to the motor is closed, rapid rotation of the stem in a clockwise direction will cause the pressure of contents in the receptacle to bear upwardly against the downwardly facing shoulders of the agitator, thereby continually forcing the agitator into firm engagement with the stem.

Through action of the spiral blade the ingredients of the receptacle are constantly drawn downwardly adjacent the stem and forced upwardly on the wall of the container. Since ice cream tends to float near the surface of the liquid used in preparing a food drink it is obvious that, with my attachment, the cream will be drawn into engagement with the cutting edges of the agitator and with the mixing blade, thus being broken up and commingled with the liquid much more thoroughly and in less time than is possible with equipment heretofore available.

What I claim and desire to secure by Letters Patent is:

1. In combination with a receptacle and a mixer including a stem having a downwardly tapered portion adapted to extend into the receptacle and having a detachable mixing blade on its lower end, an agitator slidably mounted on said tapered portion in spaced relation with the blade and held on said tapered portion by frictional engagement of the agitator with the stem, and means on the agitator for effecting a continuous upward thrust of the agitator on said tapered portion in response to rotation of the agitator in liquid contained in the receptacle.

2. In combination with a receptacle and a mixer including a stem having a downwardly tapered portion adapted to be extended into the receptacle and having a detachable mixing blade on its lower end, an agitator slidably mounted on the tapered portion of the stem and held on said tapered portion by frictional engagement of the agitator with the stem, and a spiral groove in said agitator forming a downwardly facing spiral shoulder to effect a continuous upward thrust of the agitator on said tapered portion in response to rotation of the agitator in liquid contained in the receptacle.

3. In combination with a receptacle and a mixer including a stem adapted to extend into the receptacle and having a downwardly tapered portion, an agitator having an axial opening of uniform diameter for receiving the stem and held on the stem by frictional engagement of the agitator with the stem, and a spiral groove in the agitator forming a downwardly facing spiral shoulder to effect a continuous upward thrust of the agitator on the stem when submerged and rotated in liquid contained in the receptacle.

4. In combination with a receptacle and a mixer including a stem adapted to extend into the receptacle and having a downwardly tapered portion, an agitator having a bore for slidably receiving the stem and held on said tapered portion by frictional engagement of the agitator with the stem, the agitator having a spiral groove therein forming a downwardly facing spiral shoulder for effecting continuous upward thrust of the agitator on said tapered portion of the stem in response to rotation of the agitator in liquid contained in the receptacle.

In testimony whereof I affix my signature.

DAVID E. DOBYNS.